(12) United States Patent
Cai

(10) Patent No.: US 6,501,999 B1
(45) Date of Patent: Dec. 31, 2002

(54) MULTI-PROCESSOR MOBILE COMPUTER SYSTEM HAVING ONE PROCESSOR INTEGRATED WITH A CHIPSET

(75) Inventor: Zhong-Ning Cai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,286

(22) Filed: Dec. 22, 1999

(51) Int. Cl.[7] ................................................. G05B 9/02
(52) U.S. Cl. ............................................ 700/82; 713/340
(58) Field of Search .......................... 700/4–5, 2, 82; 968/535; 713/320–324, 340

(56) References Cited

U.S. PATENT DOCUMENTS

| | | | | |
|---|---|---|---|---|
| 5,142,684 A | * | 8/1992 | Perry et al. ................... 713/320 |
| 5,239,495 A | * | 8/1993 | Nanno et al. ................. 713/321 |
| 5,410,713 A | * | 4/1995 | White et al. .................. 713/330 |
| 5,504,908 A | * | 4/1996 | Ikeda ............................ 713/300 |
| 5,737,613 A | * | 4/1998 | Mensch, Jr. .................. 713/322 |
| 5,901,322 A | * | 5/1999 | Herbst et al. ................. 713/322 |
| 6,023,641 A | * | 2/2000 | Thompson ........................ 607/9 |
| 6,029,249 A | * | 2/2000 | Atkinson ...................... 713/323 |
| 6,311,287 B1 | * | 10/2001 | Dischler et al. ............. 713/601 |
| 2001/0003206 A1 | * | 6/2001 | Pole et al. .................... 713/320 |

FOREIGN PATENT DOCUMENTS

EP          0617812 B1  *  3/1998  ............. G06F/1/32

* cited by examiner

*Primary Examiner*—Thomas Black
*Assistant Examiner*—Crystal J. Barnes
(74) *Attorney, Agent, or Firm*—Fish & Richardson P.C.

(57) ABSTRACT

Computer systems having two processors of different clock frequencies and different levels of power consumption. An interface circuit can select one of the two processors to operate at a time to reduce power consumption without compromising the system performance.

19 Claims, 3 Drawing Sheets

MULTI-PROCESSOR MOBILE COMPUTER SYSTEM HAVING ONE PROCESSOR INTEGRATED WITH A CHIPSET

BACKGROUND

This specification is related to devices and systems with electronic processors, and more specifically, to mobile computer systems.

A mobile computer has traditionally been a less powerful substitute for a regular desktop computer. However, advances in mobile computer technology have made performance of many mobile computers comparable to that of their desktop counterparts. One convenient feature of mobile computers is that they are mobile and can be operated wherever the user may desire, on battery power without AC power. However, a battery can store only a limited amount of energy. The operating time of a mobile computer in the battery operation mode is approximately inversely proportional to the power consumed by the mobile computer. It is therefore desirable to reduce the power consumption.

Many mobile computers use a single microprocessor and have system configurations similar to those of single-processor desktop computers. In order to reduce power consumption, mobile computers often implement a number of power-saving mechanisms. For example, a mobile computer may be put into a standby mode or a suspended mode in which certain functions of the microprocessor and operations of other components (e.g., the spinning motion of the hard drive or the optical storage disk) may be stopped or the power to certain devices and components may be turned off. Hence, the system operates at a low power level. The operating voltage of the power supply and the CPU clock frequency of the microprocessor may also be changed to a set of predetermined low values whenever permissible to save the battery power and to extend the battery operation time.

SUMMARY

The present disclosure includes special system architectures that implement at least two processors. One embodiment of such computer systems includes a first processor of a first clock frequency and a first level of power consumption, and a second processor of a second clock frequency and a second level of power consumption. The second clock frequency and second level of power consumption are respectively less than the first clock frequency and first level of power consumption.

An interface circuit is coupled to control the first and second processors and is configured to select one of the first and second processors to operate at a time. The electric power to the first processor is turned off when the second processor is selected to operate.

Such a system can be used to extend the operating time when powered by a battery.

BRIEF DESCRIPTION OF THE DRAWINGS

These and other aspects will now be described in detail with respect to the accompanying drawings, wherein.

DETAILED DESCRIPTION

Figure 1:
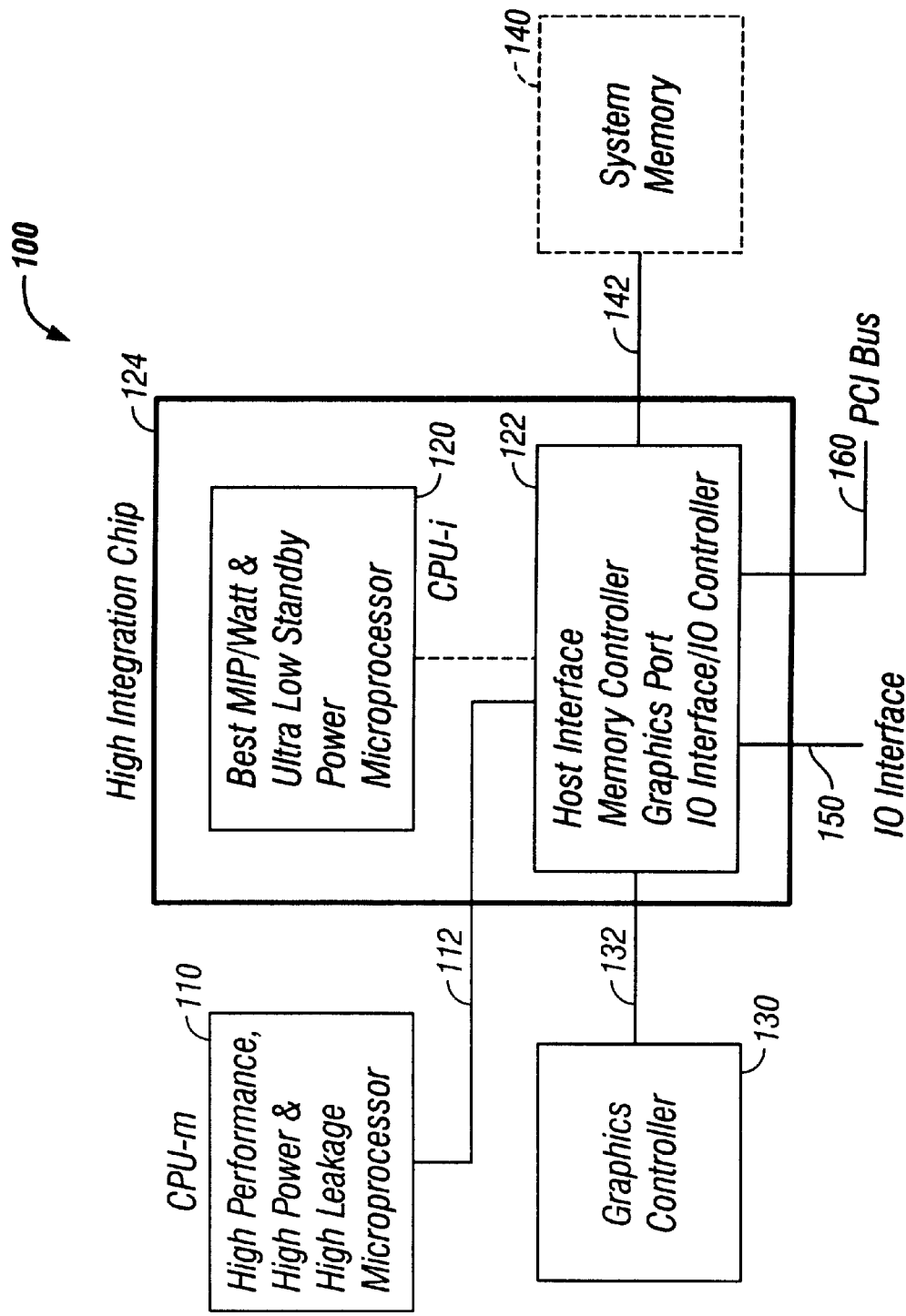
FIG. 1 is a block diagram showing one embodiment of a two-processor mobile computer system.

The mobile computer systems of this disclosure are at least in part based on the recognition that many conventional mobile computer architectures with a single microprocessor may not be able to satisfactorily meet the demands for both high computing power and a long battery operating time. High computing performance requires a high-performance processor that operates at a high clock frequency, e.g., of at least hundreds of millions operations per second. Such high-frequency operations can consume a significant portion of the total electrical power in those single-processor mobile computers. Hence, low threshold voltage, low-power standby mode, and dynamic voltage and frequency scaling techniques, among other power-saving techniques, are frequently used in mobile computers to reduce their power consumption, especially when operating in the battery operation mode.

The effectiveness of these power-saving schemes can be limited. For example, the supplying voltage Vcc for many existing microprocessors is often purposely designed at a low level (e.g. around or below 1 V) to reduce their power consumption. This low bias voltage Vcc limits the range for swinging the Vcc in the voltage scaling technique in part because the signal-to-noise ratio must be maintained above an acceptable minimum value. In addition, each time the voltage Vcc and the CPU clock frequency are adjusted, the phase look loop takes some time, e.g., hundreds of microseconds in certain processors, to stabilize the Vcc and the clock frequency to their new values. During this period of stabilization, the microprocessor may not be operable to carry out certain operations, especially, some time-sensitive operations such as a timing-critical interrupts. This delay can compromise the performance of the mobile computer.

Furthermore, many high-performance processors are designed to have very small feature sizes (e.g., less than 0.18 micron) in their highly-integrated circuit elements and can generate significant leakage currents due to factors such as tunneling. These leakage currents can cause power dissipation through leakage, even when a processor is in a power-saving mode in which the clocking of execution units and some other functions are turned off while the power to the CPU cache units, registers and other units remains. Such leakage is present as long as the power to the processor is not completely removed and hence can significantly reduce the operating time of the system in the battery operation mode.

The present mobile computer systems implement at least two processors of different levels of performance and power consumption to achieve both the overall high performance and a long operating time in the battery operation mode. One processor is a high-performance processor of a high clock frequency, which may have computing power comparable to or above that of processors used in many desktop computers. The high-performance processor may be manufactured with the latest processing technology and consumes a high level of power (including a high leakage power in the standby mode). The other processor is a power-efficient processor, which has a clock frequency lower than that of the high-performance processor and consumes less power. The power-efficient processor may be manufactured with a matured processing technology to have low leakage currents and may be optimized for the maximum number of instructions per second per watt in the battery operation mode. For example, the high-performance processor may be an Intel Pentium® III microprocessor and the power-efficient processor may be a Pentium® processor that is optimized to achieve a desired energy efficiency and may be monolithically integrated with a chipset.

The two processors may be interfaced with each other and controlled to function in a way as if there were only a single processor in the system under a power-saving mode. In one implementation, the two processors may alternatively operate to execute instructions so that only one of the processors is in operation at any given time. Hence, in the battery operation mode, when one processor is operating, the other processor can cease to operate and its power can be turned off to save power. In another implementation, the power to the power-efficient processor can remain on at all times but the power to the high-performance processor is turned off whenever the power-efficient processor is operating to execute an instruction. The power-efficient processor may be set in a power-saving mode, e.g., turning off certain functions, when it is not executing to further reduce the power consumption.

The above use of two processors essentially eliminates the power loss due to increased leakage currents often inherent in the high-performance processor. This is because its power is removed when the power-efficient processor is operating. Since the leakage of the power-efficient processor is small, the overall power consumption due to leakage of the system is significantly reduced in comparison with a system having only the high-performance processor.

A processor arbitration mechanism is implemented to determine which processor operates at a given time to provide the required computing power, especially, during the battery operation mode. The high-performance processor may be powered up to operate when an execution or a series of executions require high-performance operations, e.g., processing graphic data. Otherwise, the power-efficient processor may be used to handle operations that are relatively less computationally intensive, e.g., processing text data and handling electronic mails.

This arbitration mechanism may be invoked to operate by a user through a user interface (e.g., the keyboard or a pointing device). A software application may also be used in the system to automatically select a proper processor according to predetermined criteria based on the needed processing power and power-saving requirements. Further, a circuit element may be implemented to detect whether the AC power or the battery power is used and to activate the arbitration mechanism whenever the system is powered by its battery. When the system is operated on the AC power and power consumption is not a concern, or when the high performance is desired, the high-performance processor may be selected to operate at all times so as to achieve the highest performance available.

Hence, one aspect of this special combination of two processors is the system's high computing performance by using the high-performance processor when such is needed. Another aspect is the efficient use of the battery power by using the power-efficient processor to extend the battery operating time. The latter is achieved by turning off the power to the high-performance processor and using the power-efficient processor whenever the processing power of the power-efficient processor is adequate for the operations. Because the high-performance processor is not powered at all times it the battery operation mode, the battery operating time of this mobile computer system can be significantly longer than that of a single-processor mobile computer of comparable processing power.

FIG. 1 shows one embodiment 100 of a mobile computer system that has a high-performance processor 110 and a power-efficient processor 120. The high-performance processor 110 may be a removable chip, which can be removed from the motherboard and replaced by another processor without affecting other circuitry in the system 100. The power-efficient processor 120 may be integrated with some other circuits such as chipset 122 on the same die to form a highly-integrated chip 124. The chipset 122 provides a communication and control interface between the processors 110 and 120 and other components and devices in the system 100. Such integration can reduce the power consumption by the high-performance processor 110 and the system bus. This is in part because certain communication signals and data are now confined within the integrated chip 124, without directly going through the buses outside the chip 124. In general, the chipset 122 may include circuits for the host interface, the memory controller, the graphics port, and the I/O interface and controller for controlling an I/O interface 150 and a PCI bus 160. The processors 110 and 120 are connected to the host interface in the chipset 122 and can communicate with each other by a bus 112.

Graphics controller 130 and the main system memory 140 in the system 100 are implemented as separate chips from the chip 124 and the high-performance processor 110 on the motherboard. A bus 132, which may be a PCI bus or a special graphic bus (e.g., AGP bus), connects the graphic controller 130 to the graphic port in the chipset 122. A memory bus 142 is used to connect the memory 140 to the memory controller in the chipset 122.

The host interface in the chipset 122 is configured to include interface logic circuits as part of the processor arbitration mechanism to control and coordinate the operations of processors 110 and 120. The host interface may also control other bus masters in the system 100. One aspect of the host interface is to switch between the processors 110 and 120 transparently, in order to operate one processor at any given time. This can serially execute instructions when such operation is desirable to save power. The memory contents of the two processors 110 and 120 need to be shared whenever they are switched to ensure continuous execution. Therefore, the host interface logic is designed to command the processor, that is to be powered down, to flush all modified data in all of its caches (e.g., L1 and L2 caches) into the system memory 140. Thus, the other processor, when commanded to take over the execution, can access the modified data generated by the other processor and stored in the system memory 140 to "know" where it should start in the execution. This hence continues the execution as if the two processors 110 and 120 were a single processor.

It takes a certain time to flush the caches of a processor and to update the main memory 140. This process causes a latency that may cause delay. However, this latency may be reduced when the transition from execution by one processor to execution by another processor is properly implemented.

For example, an interrupt scheme similar to Intel's System Management Interrupt ("SMI") may be used. When the high-performance processor 110 is active in execution and is about to be taken over by the power-efficient processor 120, an interrupt is generated to command the high-performance processor 120 to store all of its architecturally visible CPU states into a special interrupt RAM. Next, the host interface in the chipset 122 sends a signal to turn off the power supply of the high-performance processor 110. At the same time, the power-efficient processor 120 becomes active and takes over the execution that is left off by the high-performance processor 110. The power-efficient processor 120 restores the content of the interrupt RAM from the high-performance processor 110 and assumes the role of the high-performance processor 110 to continue the execution. The special interrupt RAM for keeping the CPU states during a transition may be integrated on the chip 124 with the power-efficient processor 120 to reduce the latency, although it may be a separate unit on the motherboard. The latency may be further reduced when the power-efficient processor 120 begins reading the CPU states at the same time while the high-performance processor 110 sends its CPU states to the chip 124. A reverse process takes place when the execution is switched from the power-efficient processor 120 to the high performance processor 110.

Another way to reduce the transition latency is to allow direct transfer between registers of the two processors through the bus 112 by using specific pin connections or a new instruction. In addition, a software routine, e.g., operating systems or the BIOS, for the processors 110 and 120 can be designed to maintain the configuration of the dormant processor to be the same as the active processor without transferring all CPU states between them. A further transition scheme uses the processor snooping during HALT/STOP GRANT mode of the dormant processor to allow transfer of CPU states of the active processor to the dormant processor when the power is off for all CPU logics except the minimum number of logics for snooping or for controlling the I/O interface bus.

The mobile computer system 100 of FIG. 1 can be highly integrated in part by fabricating the power-efficient processor 120 and other devices on the same chip 124. This is possible because the power-efficient processor 120 is designed based on a mature processing technology that can be used to fabricate other integrated circuits of the system 100. The supplying voltage Vcc for the power-efficient processor 120 can be relatively high and hence compatible with voltages of other circuits and devices while still maintaining the number of millions of instructions per watt at a desired high level for the power-efficient processor 120. As a result, many devices and components of the system 100 may be integrated with the power-efficient processor 120 on the chip 124.

Figure 2:
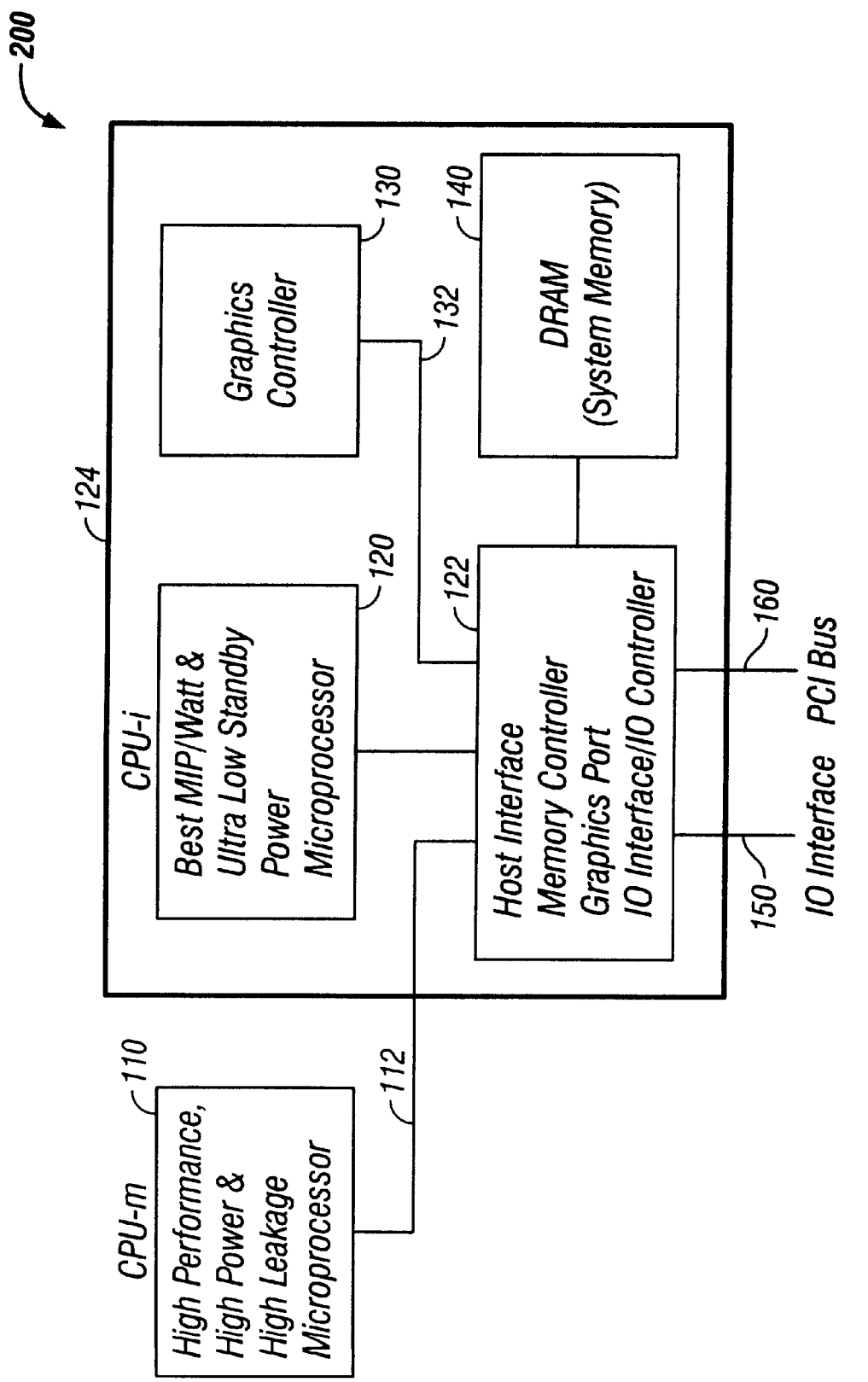
FIG. 2 is a block diagram showing another embodiment of a two-processor mobile computer system.

For example, FIG. 2 shows a modified two-processor system 200 based on the system 100 in FIG. 1. The graphic controller 130 and the system memory 140 are integrated with the processor 120 and the chipset 122 on the chip 124. The power to the processor 120 and the power to the chipset 122 and other devices on the chip 124 may be separately controlled. Hence, when it becomes desirable to turn off the power to the processor 120 when the processor 110 is operating, the chipset 122 and other devices can still be powered to perform their functions.

The high-performance processor 110 may be separated from the chip 124 to allow necessary upgrade to faster high-performance processors. This design can considerably reduce the system cost because the life cycle of high-performance processors is generally longer than life cycles of chipsets 122, the graphic controller, and other computer devices and components.

The above two-processor mobile computer systems are not limited to a power-saving mode in which only one of the two processors is operating at any given time while the other is dormant, and a high-performance mode in which the high-performance processor 110 is operating at all times while the power-efficient processor 120 is dormant. Such systems may be further configured to operate in a concurrent multiprocessing mode in which the two processors 110 and 120 can execute instructions of different program tasks or threads at the same time. A configuration register can be implemented, e.g., on the chip 124, to determine which one of the three modes the system should operate at a request of the user or a command by an application or some control circuit in the system.

In one implementation of the concurrent multiprocessing mode, multiple programs or multithreaded programs can be run through each of the two processors 110 and 120. In another implementation, the high-performance processor 110 may be designated as the main processor to run computation-intensive applications while the power-efficient processor 120 may be designated as the supplementary processor to run applications that do not demand high computation power. For example, the processor 120 may be an intelligent I/O processor to run local programs and to manage I/O devices.

Figure 3:
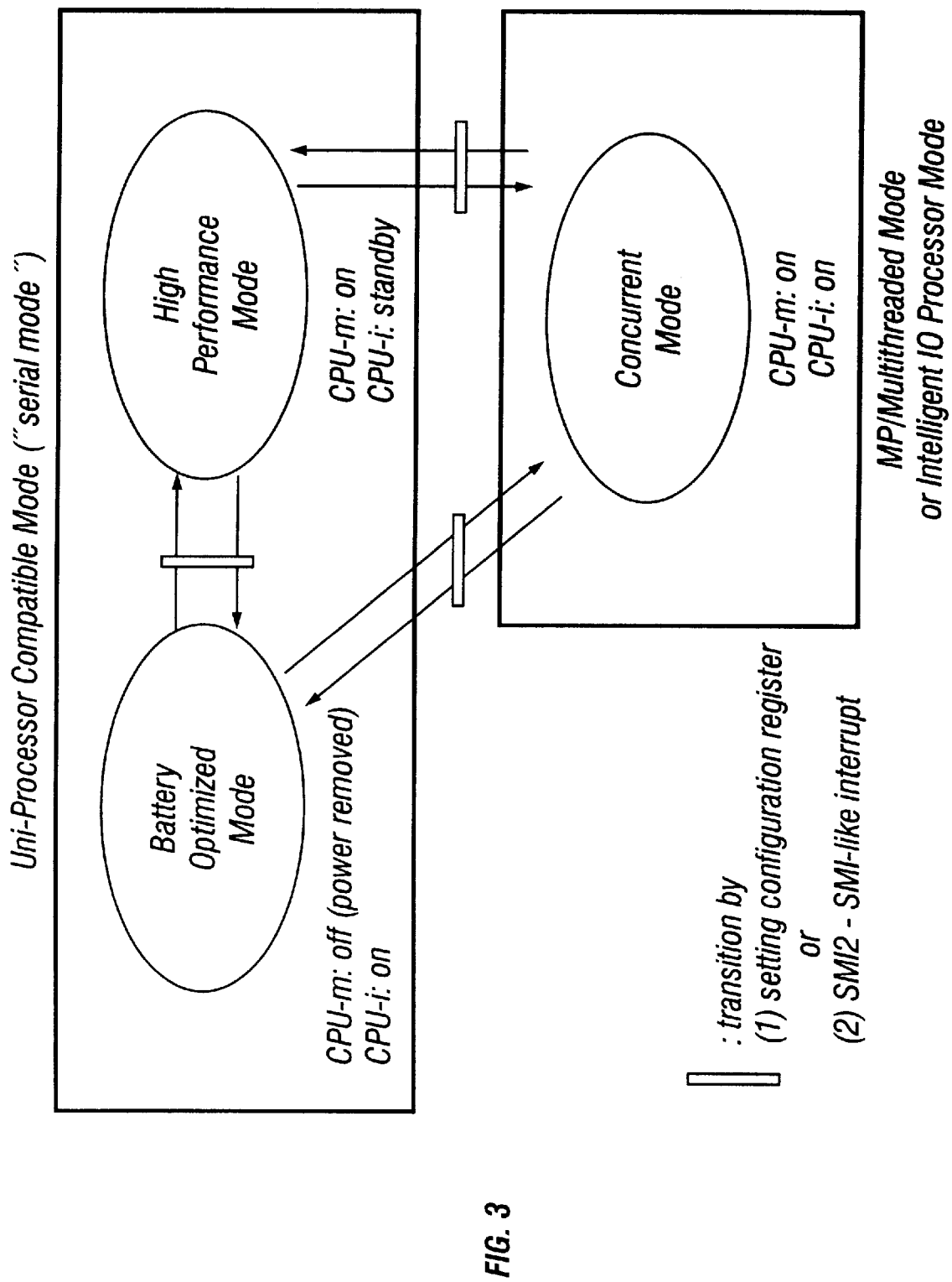
FIG. 3 shows three different exemplary operating states under a concurrent multiprocessing mode and a serial execution mode for the systems shown in FIGS. 1 and 2.

Hence, the systems 100 and 200 may be configured to operate in either a serial mode in which the processors 110 and 120 in combination behave as a single processor, or in a concurrent mode in which both processors 110 and 120 can operate at the same time. FIG. 3 shows three different exemplary operating states based on the two modes for the systems 100 and 200. Switching between the two modes can be done by resetting the configuration register based on the operating conditions and performance requirements for different applications. The operating system, the BIOS, or an application may be used to reset the configuration register.

The two processors 110 and 120 in general may be formed from any suitable processors. They may have different architectures or operate on different operating systems or different instruction sets. Sometimes the differences between the processors 110 and 120 can present problems. A proper interfacing mechanism can be used to harmonize the two processors 110 and 120 when necessary. The interfacing mechanism may be implemented in hardware, software, or a combination of both.

For example, instruction sets of the processors 110 and 120 may be different. Hence, an instruction for the high-performance processor 110, that is required to carry out an operation of an application program running on the system, may not exist in the instruction set of the power-efficient processor 120. Hence, in order to use the processor 120 to carry out the instruction, the interfacing mechanism may be designed to use a combination of native instructions for the power-efficient processor 120 to perform the instruction. When the combination does not exist, the processor 110 may need to be used, even when the power-saving operation demands operation by the power-efficient processor.

Although only a few embodiments are disclosed, other modifications and variations are contemplated.

What is claimed is:

1. A computer system, comprising:
   a first processor, operating at a first clock frequency and a first level of power consumption;
   a second processor of a second clock frequency and a second level of power consumption, said second clock frequency and second level being respectively less than said first clock frequency and said first level of power consumption; and
   an interface circuit, coupled to control said first and second processors to select one processor to operate at a particular time, wherein electric power to said first-processor is turned off when said second processor is selected to operate.

2. A computer system as in claim 1, further comprising a chipset that controls the communication among said first and second processors, wherein said interface circuit is built into said chipset, and wherein said second processor and said chipset are integrated on a single substrate.

3. A computer system as in claim 2, further comprising a system memory, and a graphic controller, wherein said system memory and said graphic controller are integrated with said second processor and said chipset on said single substrate.

4. A computer system as in claim 1, wherein said interface circuit selects only one of said first and second processors to operate at a particular time when AC power is not available.

5. A computer system as in claim 1, wherein said interface circuit maintains power to said second processor when said first processor is selected to operate.

6. A computer system, comprising:
   a first processor, operating at a first clock frequency and a first level of power consumption;
   a second processor of a second clock frequency and a second level of power consumption, said second clock frequency and second level being respectively less than said first clock frequency and said first level of power consumption; and
   an interface circuit, coupled to control said first and second processors to select one processor to operate at a particular time, wherein said first processor is turned off when said second processor is selected to operate, and wherein said interface circuit turns off electric power to said second processor when said first processor is selected to operate.

7. A computer system as in claim 1, wherein said interface circuit selects said first processor to execute one or a series of instructions when processing power of said second processor is insufficient to execute said one or series of instructions.

8. A method of operating two processors in a computer system, comprising:
   providing a first processor of a first clock frequency and a first level of power consumption, and a second processor of a second clock frequency and a second level of power consumption, which are respectively less than said first clock frequency and said first level of power consumption;
   selecting only one of said first and second processors to operate at a time; and
   turning off electric power to said first processor when said second processor is selected to operate.

9. A method of operating two processors in a computer system, comprising:
   providing a first processor of a first clock frequency and a first level of power consumption, and a second processor of a second clock frequency and a second level of power consumption, which are respectively less than said first clock frequency and said first level of power consumption;
   selecting only one of said first and second processors to operate at a time;
   turning off electric power to said first processor when said second processor is selected to operate; and
   making data in at least one cache of one processor of said first and second processors available to another processor after said one processor completes execution of one or more instructions and said another processor is to replace said one processor for a subsequent execution.

10. A method as in claim 9, wherein said data in at least one cache of said one processor is saved to a system memory shared by said first and second processors.

11. A method as in claim 10, wherein an interrupt is generated, when said one processor is to be replaced by said another processor for said subsequent execution, to command said one processor to save said data in said system memory.

12. A method as in claim 9, wherein said data from said one processor is directly transferred to said another processor.

13. A method of operating two processors in a computer system, comprising:
   providing a first processor of a first clock frequency and a first level of power consumption, and a second processor of a second clock frequency and a second level of power consumption, which are respectively less than said first clock frequency and said first level of power consumption;
   selecting only one of said first and second processors to operate at a time;
   turning off electric power to said first processor when said second processor is selected to operate; and
   establishing a communication between said first and second processors to inform CPU states of one processor of said first and second processors to another processor after said one processor completes execution of one or more instructions and said another processor is to replace said one processor for a subsequent execution.

14. A method as in claim 13, wherein said CPU states of said one processor are saved into a memory accessible to said another processor.

15. A method as in claim 13, wherein said CPU states of said one processor are directly transferred to said another processor.

16. A method as in claim 13, wherein a software routine is used to inform said CPU states of said one processor to said another processor.

17. A computer system, comprising:
   a first chip having a first processor of a first clock frequency and a first level of power consumption;
   a second chip separate from said first chip and configured to have a second processor of a second clock frequency and a second level of power consumption which are respectively less than said first clock frequency and said first level of power consumption;
   a chipset integrated on said second chip to provide communication to and from said first and second processors, said chipset including an interface circuit configured to select one of said first and second processors to operate at a time, wherein electric power to said first processor is turned off when said second processor is selected to operate.

18. A computer system as in claim 17, further comprising a system memory and a graphic controller that are integrated on said second chip.

19. A computer system as in claim 17, further comprising a RAM unit formed on said second chip to store CPU states from said first and second processors.

* * * * *